April 5, 1949. G. L. PAINE ET AL 2,466,555
PEA AND BEAN HARVESTING ATTACHMENT FOR TRACTORS
Filed Sept. 27, 1947 3 Sheets-Sheet 1
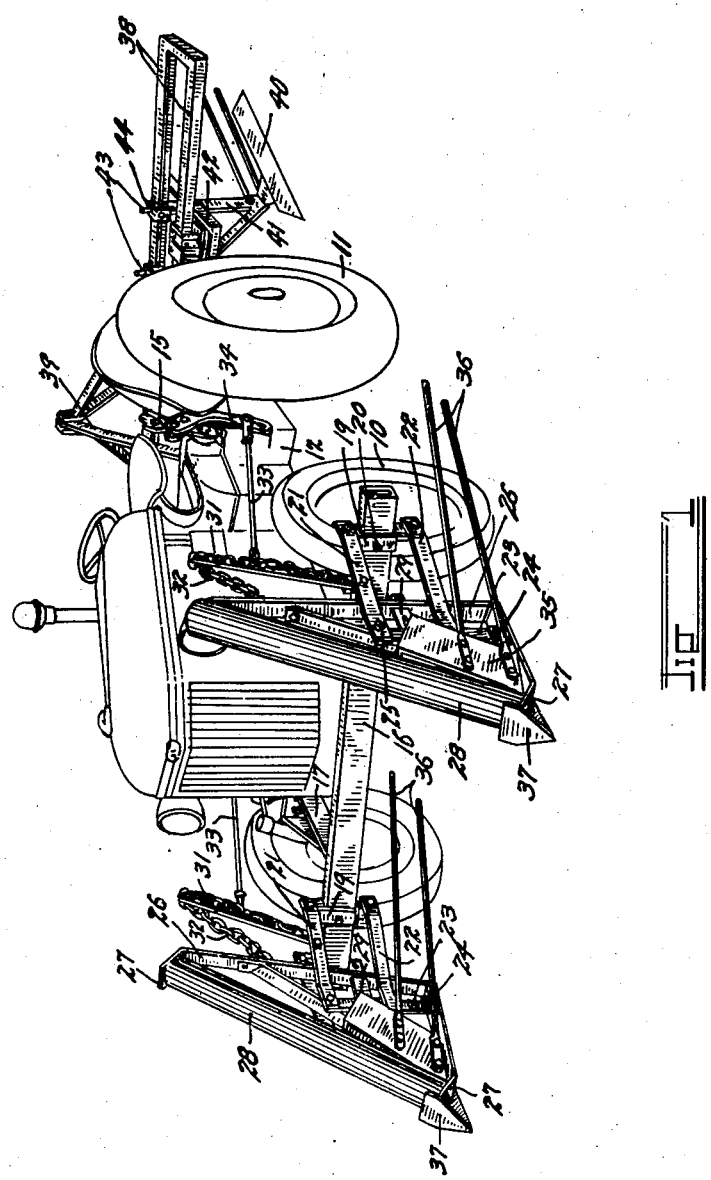
Inventors
ORVILLE S. HARBISON
GEORGE L. PAINE
Attorney

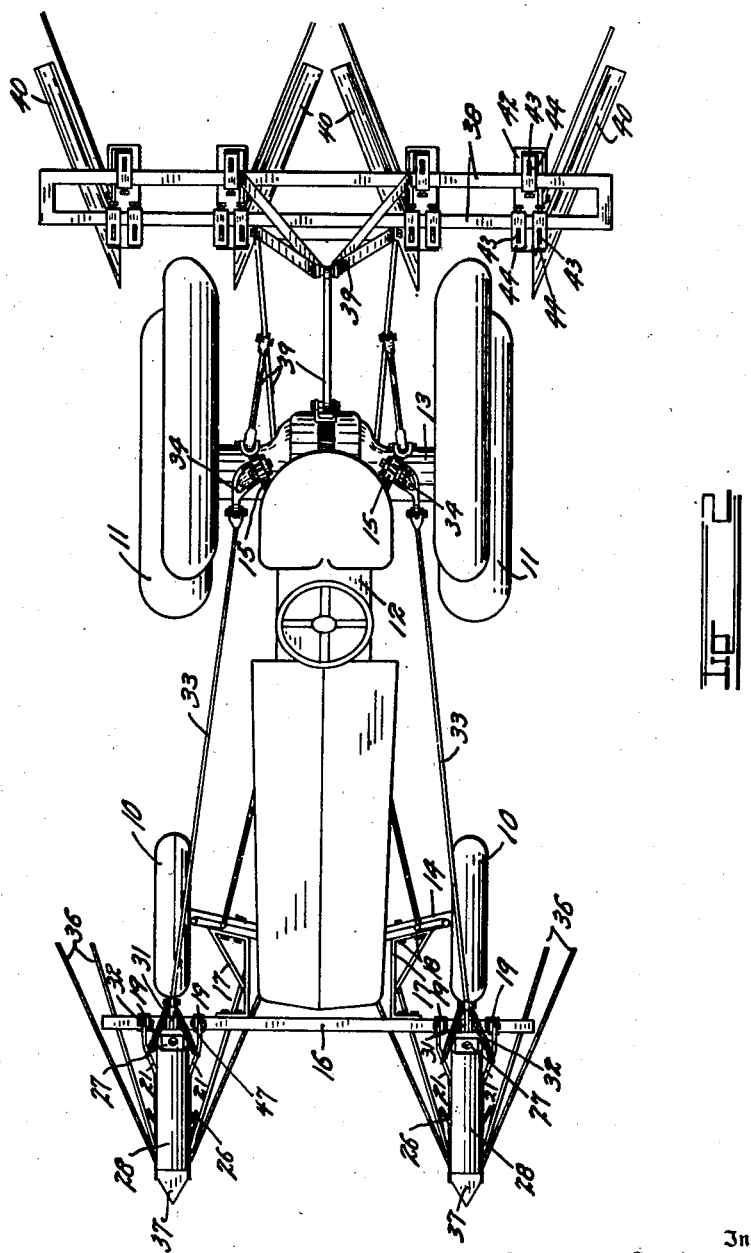

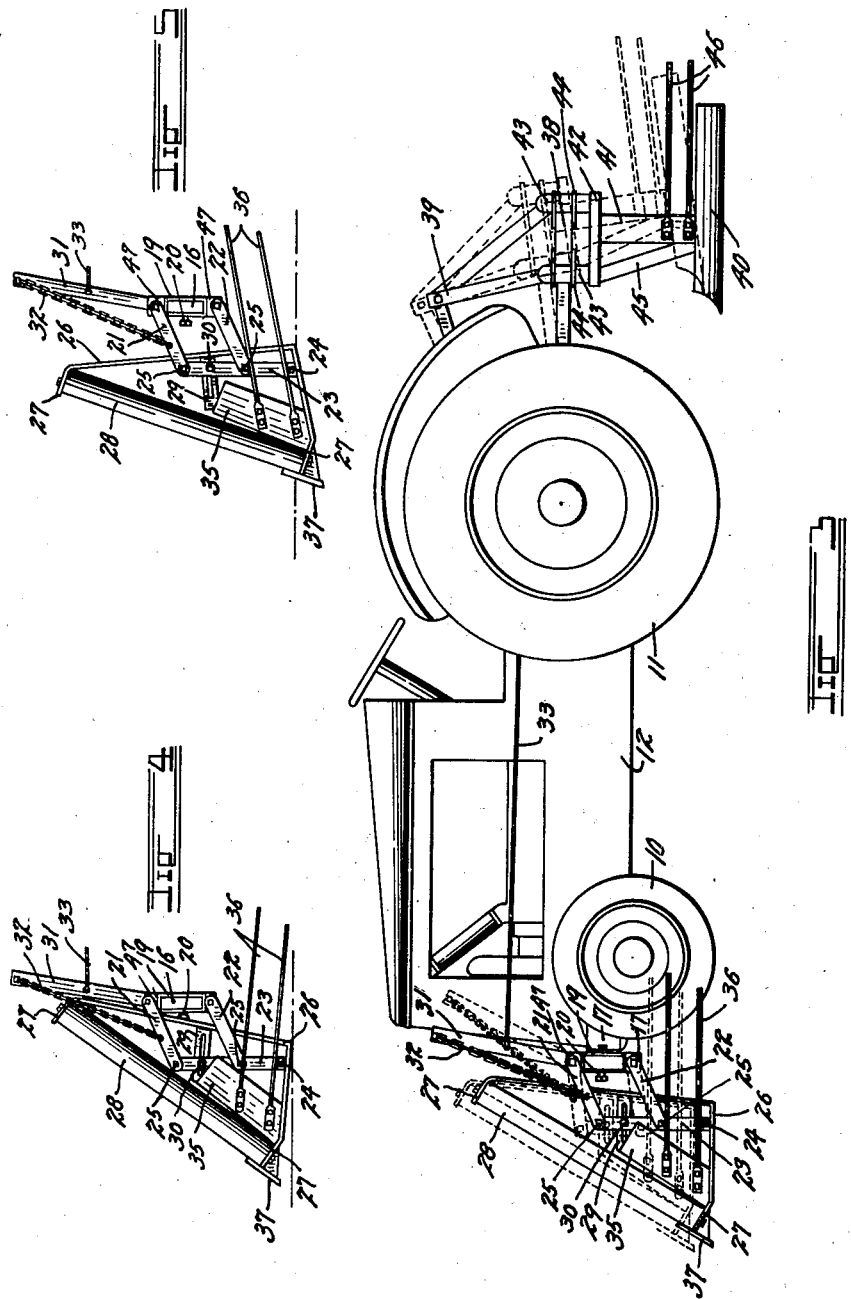

Patented Apr. 5, 1949

2,466,555

UNITED STATES PATENT OFFICE 2,466,555

PEA AND BEAN HARVESTING ATTACHMENT FOR TRACTORS

George L. Paine and Orville S. Harbison, Loveland, Colo.

Application September 27, 1947, Serial No. 776,446

7 Claims. (Cl. 56—314)

1

This invention relates to a pea and bean harvesting attachment for tractors.

The principal object of the invention is to provide a harvesting attachment which can be easily and quickly attached to a conventional farm tractor; which will be light in weight and simple to operate; and which will function efficiently and rapidly to lift four rows of vines from the ground, sever them from the roots, and pile them in neat windrows between the rows.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view of the improved vine lifting and cutting attachment in place on a typical farm tractor, in the raised or traveling position;

Fig. 2 is a plan view thereof;

Fig. 3 is a side view thereof in the operating position; and

Figs. 4 and 5 are diagrammatic views, illustrating the operation of the vine lifter adjustments used in the machine.

In the drawing, parts of a typical farm tractor are designated by numeral as follows: front guide wheels 10, rear wheels 11, chassis 12, rear axle 13, front axle 14, and implement lift levers 15.

The invention consists of a vine lifting portion and a vine cutting portion. The vine lifting portion is positioned ahead of the tractor, and the vine cutting portion is positioned behind the tractor.

The vine lifting portion of the attachment is mounted on a cross beam 16 which extends across the front of the tractor, projecting outwardly at both sides beyond the front wheels 10. The cross beam 16 may be secured to the tractor in any desired manner, such as by means of supporting brackets 17 bolted to the front axle 14 by means of suitable bolts 18. Four rectangular hinge frames 19 are mounted on the cross beam 16 and may be adjusted therealong to any desired position. After adjusting, the frames 19 may be set in any desired position by means of set screws 20.

Hinge ears 47 project upwardly and downwardly from the hinge frames 19. An upper parallel link 21 is hinged to the upper hinge ear 47 of

2 each frame, and a lower parallel link 22 is similarly hinged to the lower hinge ear 47 of each frame.

The frames 19 are arranged in pairs adjacent each extremity of the cross beam 16 so that the upper and lower links 21 and 22 will extend forwardly therefrom in pairs. The links extending from each of the frames 19 are hinged to a vertical riser bar 23 by means of suitable hinge bolts 25. The two riser bars 23 of each pair of frames are hinged at their lower extremities by means of hinge bolts 24 to a lower horizontal leg of an L-shaped roller frame 26.

The extremities of the legs of each L-shaped frame are turned to extend parallel with each other, as shown at 27, and a freely revolving vine roller 28 is mounted between the parallel extremities 27. Thus it can be seen that the vine rollers 28 may be tilted forward and back about the axis of the bottom hinge bolts 25, as shown in Figs. 4 and 5. A slotted brace bar 29 extends forward from the vertical leg of each L-shaped frame 26 to a position between the pairs of riser bars 23. A clamp bolt 30 passes through the riser bars and through the slots in the brace bar 29, by means of which the L-shaped frames 26 and the rollers 28 may be locked at any desired incline.

A lifting lever 31 is hingedly mounted on the cross beam 16 between each pair of hinge frames 19, and extends upwardly therefrom. A pair of chains 32 extends downward from the upper extremity of each lifting lever to the two upper links 21 therebelow. The lifting levers 31 may be swung forward and back to raise and lower the links 21 and 22 by means of connecting rods 33, there being one connecting cable 33 extending rearwardly from each lifting lever 31. The cables 33 connect to lever brackets 34, there being one lever bracket mounted on each of the implement lift levers 15 so as to extend downwardly therefrom.

Thus, as the rear extremities of the implement lift levers rise, the lower extremities of the lever brackets 34 will be swung rearwardly to pull upon the cables 33 and lift the links 21 and 22. Since the links 21 and 22 are all of uniform length, and since the upper and lower bolts 18 are vertically aligned, the riser bars 23 will always rise and fall in a vertical position. Therefore, the L-shaped frames 26 and the rollers 28 will remain in the same adjusted position, regardless of their vertical position, as shown in Fig. 5.

Two flaring dividing plates 35 are welded to each of the bottom legs of the L-shaped frames 26.

The plates 35 extend parallel to the rollers and flare outward from each other at the rear to throw the vines outward to each side of each roller. A pair of vine piling rods 36 are secured at their forward extremities to each plate 35 and extend outwardly and rearwardly therefrom. A pointed vine lifting shoe 37 is welded on the lower parallel portion 27 of each L-shaped frame 26 to lift the vines from the ground.

In use, the frames 19 are set along the cross beam 16 so that each of the rollers 28 will be positioned between two rows of vines. The implement lift levers 15 are now actuated to lower the lower legs of the frames 26 to the ground. The tractor is then driven along the rows with its wheels traveling between the rows. The shoes 37 lift the vines lying on the ground between the rows and the vines slide up the inclined rollers 28. The rollers pull the vines of one row apart from the vines of the adjacent row and divide them into their individual rows. The vines pull from the rollers and are spread apart and piled along the rows by the dividing plates 35 and the piling rods 36 so that they will lie in neat, aligned windrows along their rows ready for cutting.

The cutting is accomplished by means of the cutting portion of the device, which is mounted on the rear of the tractor.

The usual farm tractor is provided with a tiller bar 38, consisting of two parallel members which are carried from a system of linkage 39 on the rear of the tractor, commonly known as the "Ferguson system." The linkage 39 connects to the implement lift levers 15 so that the tiller bar will be raised when the rear extremities of the lift levers 15 move upwardly and forwardly. The tiller bar 38 is used for carrying any desired ground-working implements, such as cultivator blades, plows, discs, and the like. This invention makes use of this well-known tiller bar.

This invention, for four-row work, employs four cutting knives 40, two of which are right-handed and two left-handed. Each knife is suspended from adjacent its forward extremity by means of a vertically extending knife arm 41. The knives are sharpened on their forward edges and lie parallel to the ground surface. They are inclined upwardly toward their rear edges and lie at an angle of approximately 45° across the rows.

The knife arms 41 extend downward from horizontal top frames 42, each of which is provided with three vertical posts 43 which pass through and are clamped against the two members of the tiller bar by means of typical cultivator blade clamps 44. A diagonal brace 46 extends from each frame 42 to the arm 41 to brace the latter from swinging rearward. Vine piling rods extend rearward from each knife arm 41 parallel to the knife blade 40.

The knives are set along the tiller bar 38 alternately right and left, and each knife is positioned to lie across one row. The knives sever the vines, which have been separated and windrowed by the dividing portion of the attachment, at the ground level and leave the cut vines piled in the rows.

Since both the vine lifting portion and the vine cutting portion are connected to the implement lift levers 15, they rise and fall in unison. Therefore, the operator can bring the entire harvester into and out of operation by simply operating the hydraulic implement lift of the tractor.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A vine harvesting attachment for a tractor of the type having implement lift levers, comprising: a cross beam secured across the front of said tractor and projecting from opposite sides thereof; an upper pair of hinge ears extending upward from said cross beam; a lower pair of hinge ears extending downward from said cross beam; a pair of upper links extending forward from said upper hinge ears; a pair of lower links extending forward from said lower hinge ears, said links being similar in length; means connecting said links to said implement lift levers so that movement of the latter will swing said links vertically; a vertical arm secured to the forward extremities of said links; a roller frame hingedly mounted on said vertical arm; an inclined vine-dividing roller carried by said roller frame; and releasable means for holding said roller frame at any desired angle in relation to said vertical arm.

2. A vine harvesting attachment for a tractor of the type having implement lift levers, comprising: a cross beam secured across the front of said tractor and projecting from opposite sides thereof; an upper pair of hinge ears extending upward from said cross beam; a lower pair of hinge ears extending downward from said cross beam; a pair of upper links extending forward from said upper hinge ears; a pair of lower links extending forward from said lower hinge ears, said links being similar in length; means connecting said links to said implement lift levers so that movement of the latter will swing said links vertically; a vertical arm secured to the forward extremities of said links; a roller frame hingedly mounted on said vertical arm; an inclined vine-dividing roller carried by said roller frame; a brace arm extending from said frame across said vertical arm; and means for adjustably securing said brace arm to said vertical arm so that the angle of the roller frame in relation to the vertical arm may be varied as desired.

3. A vine harvesting attachment for a tractor of the type having implement lift levers, comprising: a cross beam secured across the front of said tractor and projecting from opposite sides thereof; an upper pair of hinge ears extending upward from said cross beam; a lower pair of hinge ears extending downward from said cross beam; a pair of upper links extending forward from said upper hinge ears; a pair of lower links extending forward from said lower hinge ears, said links being similar in length; means connecting said links to said implement lift levers so that movement of the latter will swing said links vertically; a vertical arm secured to the forward extremities of said links and extending downward therefrom; an L-shaped roller frame having a vertical and a horizontal leg, the vertical leg extending upward between the links of the respective pairs of links, and its horizontal leg extending forwardly beneath said vertical arm; hinge means supporting said lower leg from said vertical arm; a vine-dividing roller rotatably mounted between the projecting extremities of said L-shaped frame so as to incline rearwardly at its top; and adjustable means for supporting said vertical leg from said vertical arm.

4. A vine harvesting attachment for a tractor of the type having implement lift levers, comprising: a cross beam secured across the front of said tractor and projecting from opposite sides thereof; an upper pair of hinge ears extending upward from said cross beam; a lower pair of hinge ears extending downward from said cross beam; a pair of upper links extending forward from said upper hinge ears; a pair of lower links extending forward from said lower hinge ears, said links being similar in length; means connecting said links to said implement lift levers so that movement of the latter will swing said links vertically; a vertical arm secured to the forward extremities of said links and extending downward therefrom; an L-shaped roller frame having a vertical and a horizontal leg, the vertical leg extending upward between the links of the respective pairs of links, and its horizontal leg extending forwardly beneath said vertical arm; hinge means supporting said lower leg from said vertical arm; a vine-dividing roller rotatably mounted between the projecting extremities of said L-shaped frame so as to incline rearwardly at its top; a brace arm extending from said vertical leg across said vertical arm; and clamping means for securing said vertical arm at any desired point along said brace arm to vary the position of said vertical leg.

5. A vine-lifting attachment for tractors comprising: a cross beam extending transversally across the front of said tractor; means supporting said beam from said tractor; four hinge frames surrounding said cross beam and being adjustable therealong to form pairs adjacent each extremity of said cross beam; a hinge ear projecting upward and downward from each hinge frame; an upper parallel link hinged to the upper hinge ear of each frame; a lower parallel link hinged to the lower hinge ear of each frame, all of said links extending forward from said cross beam; a vertical riser bar hinged to the forward extremities of the upper and lower links of each hinge frame; two L-shaped roller frames, each having a vertical and a horizontal leg, the horizontal leg of each roller frame being hingedly mounted between the lower extremities of two adjacent riser bars, so that said roller frame may tilt forwardly and backwardly between the adjacent pairs of links; a vine roller extending upwardly and rearwardly from the forward extremity of the horizontal leg of each roller frame to the upper extremity of the vertical leg thereof; an adjustable brace member extending rearwardly from each pair of riser bars to a connection with the adjacent vertical leg to support said roller frames at any desired tilted position; and means supporting the forward extremities of said links.

6. In a vine-lifting attachment for tractors, a vertically adjustable riser bar supported forwardly of said tractor; an L-shaped roller frame having a vertical and a horizontal leg; an inclined roller extending from the forward extremity of said horizontal leg to the upper extremity of said vertical leg; hinge means securing said horizontal leg to the lower extremity of said riser bar; and an adjustable brace member extending from said riser bar to said vertical leg and adapted to secure said roller frame at any desired angle about said hinge means to vary the incline of said roller.

7. In a vine-lifting attachment for tractors, a vertically adjustable riser bar supported forwardly of said tractor; an L-shaped roller frame having a vertical and a horizontal leg; an inclined roller extending from the forward extremity of said horizontal leg to the upper extremity of said vertical leg; hinge means securing said horizontal leg to the lower extremity of said riser bar; an adjustable brace member extending from said riser bar to said vertical leg and adapted to secure said roller frame at any desired angle about said hinge means to vary the incline of said roller; and means for securing said roller frame at any desired angle about said hinge means to vary the incline of said roller.

GEORGE L. PAINE.
ORVILLE S. HARBISON.

REFERENCES CITED

The following references are of record in the file of this patent:

UNITED STATES PATENTS

| Number | Name | Date |
| --- | --- | --- |
| 1,005,169 | Daugherty | Oct. 10, 1911 |
| 2,064,480 | Lock et al. | Dec. 15 1936 |
| 2,305,254 | Hirschkorn | Dec. 15, 1942 |